United States Patent [19]

Seki et al.

[11] 4,247,253

[45] Jan. 27, 1981

[54] VERTICAL AXIS WIND TURBINE

[75] Inventors: Kazuichi Seki, Isehara; Yoshio Shimizu, Sagamihara; Yoshio Kato, Tokyo, all of Japan

[73] Assignee: Gakko Hojin Tokai University, Tokyo, Japan

[21] Appl. No.: 922,292

[22] Filed: Jul. 6, 1978

[30] Foreign Application Priority Data

Jul. 7, 1977 [JP] Japan .................................. 52/81601
Jul. 7, 1977 [JP] Japan .................................. 52/81602

[51] Int. Cl.³ .............................................. F03D 7/06
[52] U.S. Cl. ........................................ 416/44; 416/23; 416/32; 416/119; 416/197 A
[58] Field of Search .................. 416/119, 169, 197 A, 416/44, 227 A, 140 R, DIG. 7, 23, 51, 32, 175 A

[56] References Cited

U.S. PATENT DOCUMENTS

| 1,835,018 | 12/1931 | Darrieus | 416/227 A |
| 4,082,479 | 4/1978 | Rangi et al. | 416/23 X |

FOREIGN PATENT DOCUMENTS 860930 12/1952 Fed. Rep. of Germany .......... 416/140

*Primary Examiner*—Everette A. Powell, Jr.
*Attorney, Agent, or Firm*—Koda and Androlia

[57] ABSTRACT

Wind turbines are largely divided into vertical axis wind turbines and propeller (horizontal axis) wind turbines. The present invention discloses a vertical axis high speed wind turbine provided with rotational speed control systems. This vertical axis wind turbine is formed by having blades of a proper airfoil fitted to respective supporting arms provided radially from a vertical rotating shaft by keeping the blade span-wise direction in parallel with the shaft and being provided with aerodynamic control elements operating manually or automatically to control the rotational speed of the turbine.

3 Claims, 13 Drawing Figures

VERTICAL AXIS WIND TURBINE

BACKGROUND OF THE INVENTION

1. Field of the Invention

This invention relates to wind turbines and more particularly to a vertical axis high speed wind turbine in which the aerodynamic control of the rotational speed is achieved over its entire operational mode, i.e., the starting, normal operation and braking.

2. Prior Art

Generally, various wind turbines converting wind energy to a rotary motion have been already suggested and practiced. Among them, the propeller wind turbine (horizontal axis wind turbine) is required to have the propeller rotating disk always rightly aligned with the wind direction, whereas the vertical axis wind turbine is omni-directional, is not influenced at all by the wind direction and is better in respect of the configuration and operation.

Therefore, the present inventors have developed and suggested a vertical axis high speed wind turbine using blades of an efficient airfoil.

In the above mentioned vertical axis high speed wind turbine, the efficiency is high but the starting torque is low. Further, in the general wind turbines, at the time of such excessive wind velocity as in a typhoon, it will be necessary to control the rotational speed. Therefore, in order to practice this kind of vertical axis turbine, it is necessary to develop a means of controlling its rotational speed.

SUMMARY OF THE INVENTION

An object of the present invention is to provide a vertical axis wind turbine wherein, at the time of starting, a starting torque will be obtained.

Another object of the present invention is to provide a vertical axis wind turbine wherein, at the time of such excessive wind velocity as in a typhoon, a braking torque will be obtained.

A further object of the present invention is to provide a vertical axis wind turbine which makes an aerodynamic control which will function only at the time of starting and an excessive rotational speed but will not reduce the rotating efficiency of the wind turbine at the time of a normal operation.

A still further object of the present invention is to provide a vertical axis wind turbine which makes an aerodynamic control enabling the turbine to be controlled to operate at a preferable rotational speed to meet the wind energy level and the demand made by such output device as a generator, water heater or air compressor.

Further objects, features and advantages of the present invention will be better understood through the following description.

DETAILED DESCRIPTION OF THE INVENTION

Figure 1:
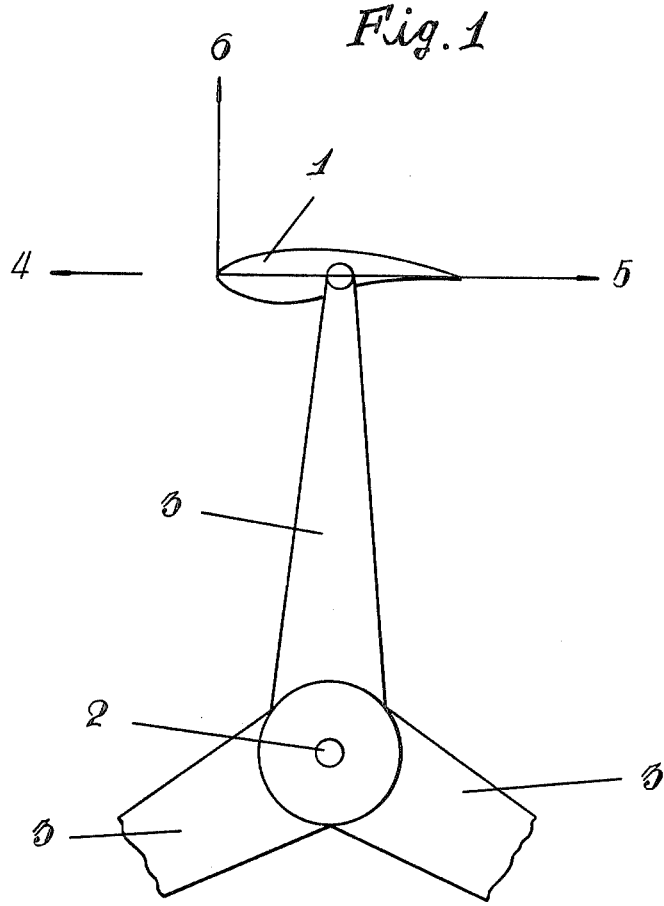
FIG. 1 is an explanatory plan view showing a blade to be used in an embodiment of the present invention as fitted to a vertical axis wind turbine.
Figure 2:
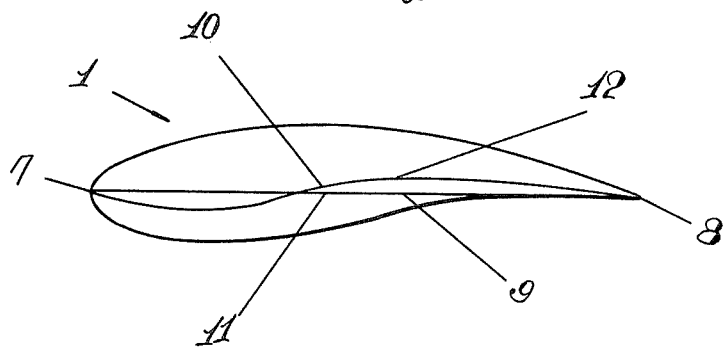
FIG. 2 is an explanatory view showing an embodiment of the airfoil of a blade to be used in the present invention.

FIGS. 1 and 2 show a blade for wind turbines to be used in a vertical axis high speed wind turbine of the present invention.

This blade 1 is fitted and fixed as shown in FIG. 1 to the ends of supporting arms 3 fitted above and below a vertical rotary shaft 2 and projecting radially therefrom. In FIG. 1, reference numeral 4 indicates an arrow showing the advancing direction of the blade and 5 and 6 indicate arrows showing respectively the positive direction on the coordinate X and the positive direction on the coordinate Y. In FIG. 2 of the airfoil of the blade 1, reference numeral 7 indicates the leading edge of the airfoil, 8 indicates the trailing edge of the airfoil, 9 indicates the chord line of the airfoil, 10 indicates a camber reversing point and 11 indicates a camber reversing position on the coordinate X of the camber reversing point 10. The above mentioned airfoil 1 is formed by giving a camber of a downward convex curvature between the leading edge 7 of the airfoil and the camber reversing position 11 and a camber of an upward convex curvature between the camber reversing position 11 and the trailing edge 8 of the airfoil so as to be a mean line 12 and giving a rational thickness distribution of this mean line.

By the form of the above mentioned airfoil, the blade used in the present invention has three characteristics required of the blade of the vertical axis wind turbine that the pitching moment coefficient should have a large negative value, the minimum drag coefficient should be small and the difference between the zero lift angle and minimum drag coefficient angle should be small.

Figure 3:
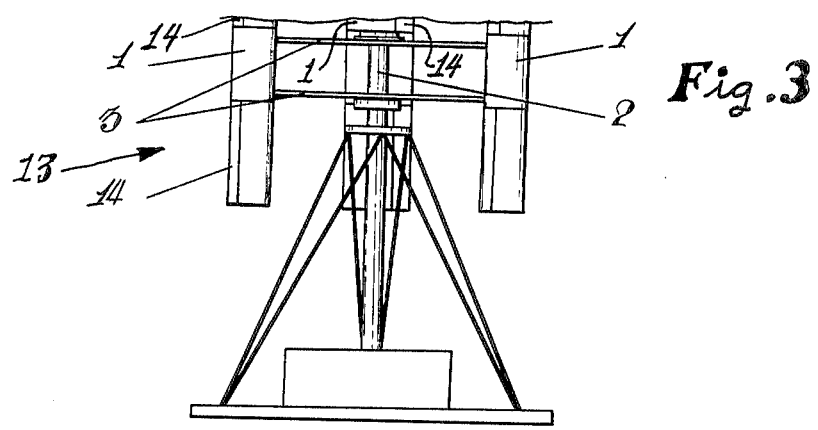
FIG. 3 is an elevation showing a wind turbine of the first embodiment of the present invention.
Figure 4:
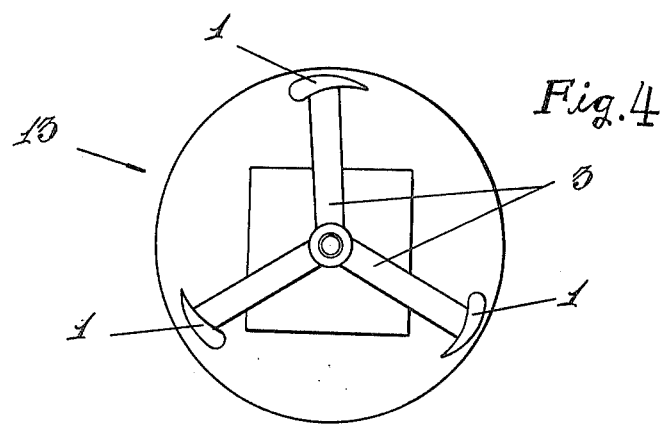
FIG. 4 is a plan view of FIG. 3.

FIGS. 3 and 4 show a vertical axis wind turbine of the first embodiment of the present invention. This vertical axis wind turbine 13 is formed by fitting and fixing the above described blades 1 in the intermediate upper and lower parts respectively to the ends of supporting arms 3 provided to project at regular intervals radially from two upper and lower flanges fixed to the vertical rotary shaft 2.

In this embodiment, an aerodynamic control element 14 to control the rotational speed of the wind turbine 13 is provided in each blade 1. This control element 14 is formed over the entire length or partially on the blade 2 as required. The control element 14 provided on the blade is so formed as to be manually or automatically operated cyclically or collectively by such known means as a hydraulic or pneumatic device.

Figure 5:
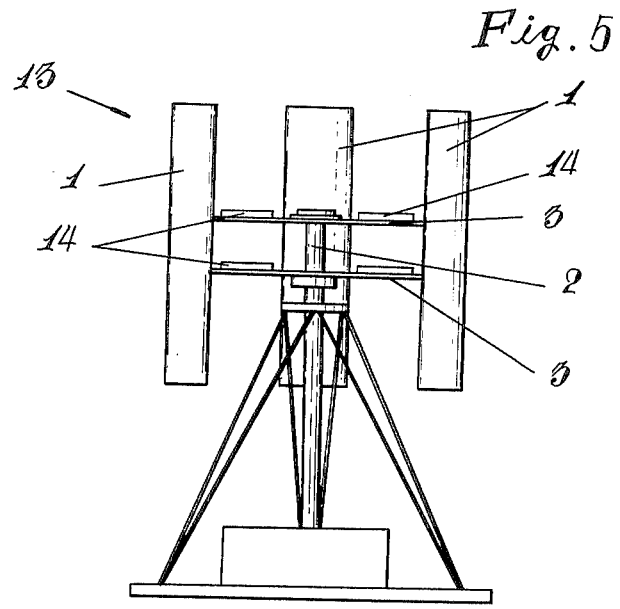
FIG. 5 is an elevation showing a wind turbine of the second embodiment of the present invention.
Figure 6:
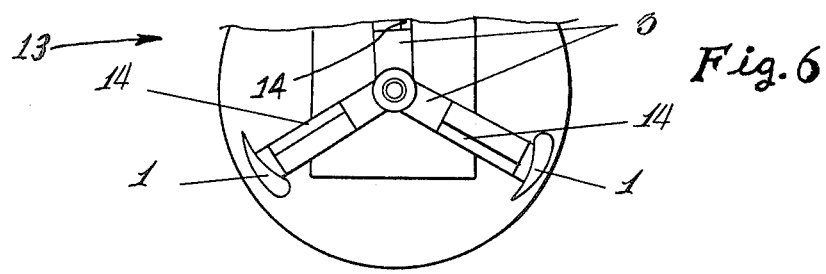
FIG. 6 is a plan view of FIG. 5.

FIGS. 5 and 6 show a vertical axis wind turbine of the second embodiment of the present invention. In this embodiment, the aerodynamic control element 14 is formed over the entire length or partially on each blade supporting arm 3.

By the way, the aerodynamic control element 14 may be of a compromise type of the first embodiment and second embodiment formed in both of the blade 1 and supporting arm 3.

Figure 7:
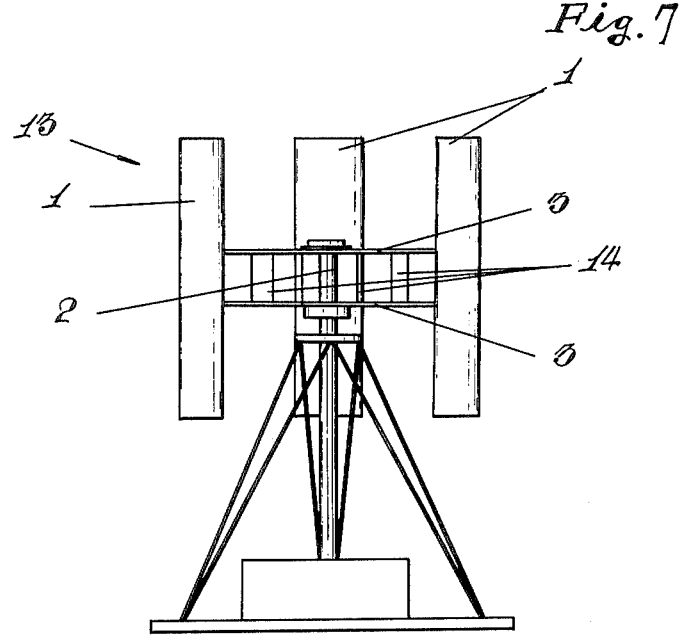
FIG. 7 is an elevation showing a wind turbine of the third embodiment of the present invention.
Figure 8:
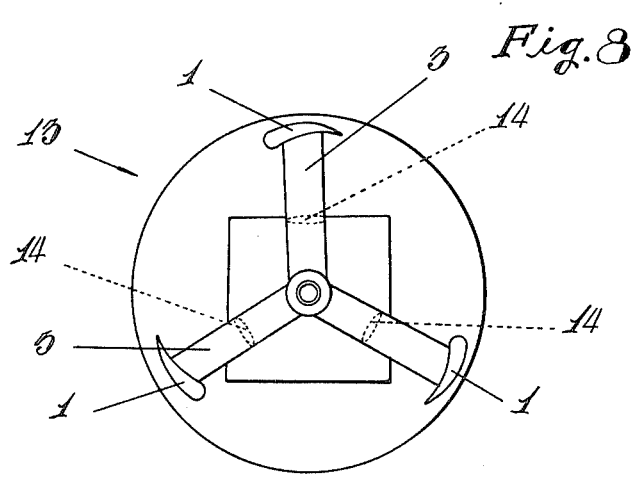
FIG. 8 is a plan view of FIG. 7.

FIGS. 7 and 8 show a vertical axis wind turbine of the third embodiment of the present invention. In this embodiment, as different from the above mentioned first and second embodiments, the aerodynamic control element is not formed on the blade 1 or blade supporting arm 3 itself but on a control blade 14a provided with said control element and is formed an an independent aerodynamic surface. Each control blade 14a is fitted in parallel with the vertical direction between the upper and lower blade supporting arms 3.

In this embodiment, the above mentioned control blade 14a may be set on a control blade supporting arm (not illustrated) provided independently of the vertical rotary shaft 2. In such case, it will be preferable to place the control blade 14a in the angular position in which the starting torque of the control blade 14a will be maximum when the starting torque of the high speed wind turbine is minimum.

Figure 9:
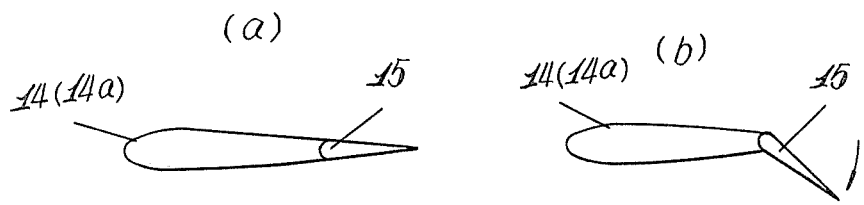
FIGS. 9 to 13 show aerodynamic control elements to be used in the present invention, (a) showing them in their normal positions and (b) showing them in their operating positions.
Figure 10:
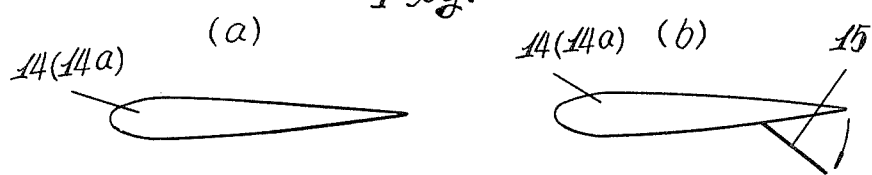
Figure 11:
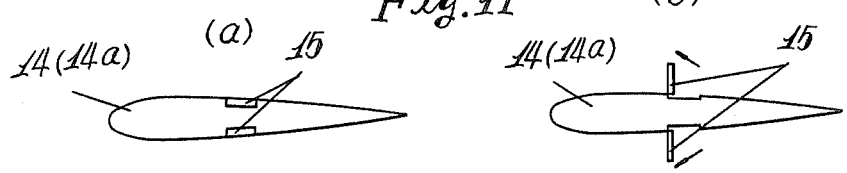
Figure 12:
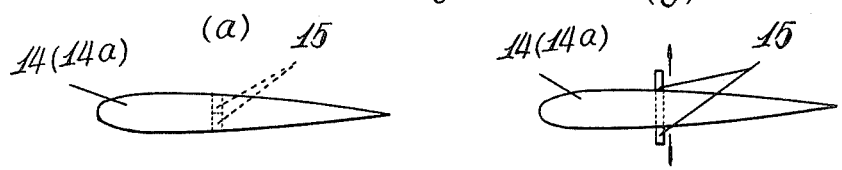
Figure 13:
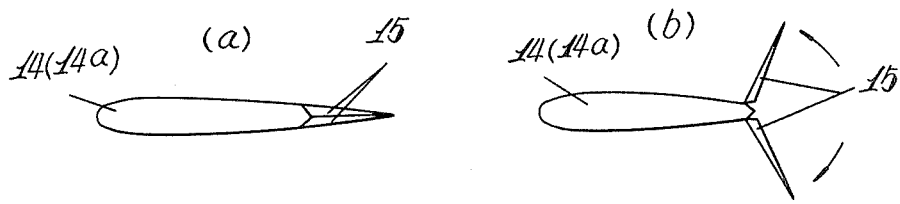

Now the respective embodiments of the aerodynamic control elements 14 to be employed in the present invention as control devices placed on the blades, blade supporting arms and control blades 14a are shown in FIGS. 9 through 13. Shown in FIG. 9 is a flap-I in which the rear portion of the airfoil is formed as a control piece 15 called a plain flap and is free to deflect as illustrated. Shown in FIG. 10 is a flap-II in which the rear portion of the airfoil has a control piece 15 called a split flap and is free to open and close in the airfoil contour. Shown in FIG. 11 is a spoiler-I which has control pieces 15 on the upper and lower surfaces of the airfoil so as to be free to open and close in the contour of the airfoil having grooves to accomodate the control pieces as closed. Shown in FIG. 12 is a spoiler-II in which the control pieces 15 of the above mentioned spoiler-I are slidable. Shown in FIG. 13 is a spoiler-III in which the rear portion of the airfoil is used also as two control pieces 15 opening toward both sides. By the way, the control element 14 or the control blade 14a provided with said element is not limited to the above mentioned embodiments.

Further, the control element 14 may be formed to be in such system wherein the starting torque and braking torque are obtained by varying the fitting angles of the blade and 1 control blade 14a without providing such control piece 15 as is mentioned above.

In the wind turbine of the present invention, at the time of starting or such excessive wind velocity as in a typhoon, the control element 14 formed on the blade 1 or supporting arm 3 or the control blade 14a provided with said control element will be manually or automatically operated by such known operating means as a hydraulic or pneumatic device to obtain a starting torque or to obtain a braking torque to control the rotational speed of the turbine.

In the following table are shown effects obtained by the control elements in the respective working manners of the respective embodiments:

| Embodiments | Control elements | | | |
|---|---|---|---|---|
| | Flap-I | Flap-II | Spoiler-I & II | Spoiler-III |
| First embodiment | A,B | A,B | A,B | A,B |
| Second embodiment | — | A,B,C | A,B | A,B,C |
| Third embodiment | A,B | A,B,C | A,B | A,B,C |

In the above mentioned table, A stands for braking by the collective control, B stands for a starting torque by the cyclic control and C stands for a starting torque by the collective control. Here, the cyclic control is to operate the control element in a specific angular position against the wind direction and the collective control is to operate the control element irrespective of the wind direction.

By the way, in the vertical axis wind turbine of the present invention, the number of the blades arranged in parallel with the vertical rotary axis is not limited to be three as in the embodiment but any rational number of blades may be preferably fitted depending on the local and meteorological conditions under which the wind turbine is to be used. This is the same also with the positions and number of the control elements and the number of control blades to be employed.

Also, in the vertical axis wind turbine of the present invention, the positions and number of the supporting arms for fitting the blades to the rotary shaft are not limited to those in the above mentioned embodiments.

As it is obvious that different embodiments and working manners can be formed in a wide range without deviating from the spirit and scope of the present invention, this invention is not limited to the specific embodiments and working manners except as defined in the appended claims.

We claim:

1. A vertical axis wind turbine comprising:
   a vertical rotary shaft;
   a plurality of pairs of support arms rotatably coupled to said rotary shaft and extending radially therefrom, each arm of each of said pairs of arms being provided parallel to and vertically displaced from another arm of another of said pairs of arms;
   a plurality of wind turbine blades, each blade being provided between a pair of support arms and being fixed to an end of each of said pair of support arms; and
   a plurality of control blades provided each between a pair of said support arms and being rotatably coupled directly to said pair of support arms, said control blades each further being radially located between said rotary shaft and said turbine blades for controlling the rotational speed of said wind turbine.

2. A vertical axis wind turbine according to claim 1, wherein each of said control elements is further provided to initially rotate from a predetermined angular position such that a starting torque on said control blade is a maximum when said starting torque on said turbine blade is a minimum.

3. A vertical axis wind turbine according to claims 1 or 2, wherein each of said wind turbine blades has a pitching movement coefficient that is a large negative value, a small minimum drag coefficient and a small difference between a zero lift angle and a minimum drag coefficient angle.

* * * * *